(12) United States Patent
McKee

(10) Patent No.: US 9,857,082 B2
(45) Date of Patent: Jan. 2, 2018

(54) COOKING OVEN

(71) Applicant: APPLIANCE INNOVATION, INC., Dallas, TX (US)

(72) Inventor: Philip R. McKee, Frisco, TX (US)

(73) Assignee: APPLIANCE INNOVATION, INC., Dallas, TX (US)

( * ) Notice: Subject to any disclaimer, the term of this patent is extended or adjusted under 35 U.S.C. 154(b) by 0 days.

(21) Appl. No.: 14/823,788

(22) Filed: Aug. 11, 2015

(65) Prior Publication Data

US 2015/0345801 A1    Dec. 3, 2015

Related U.S. Application Data

(62) Division of application No. 13/367,164, filed on Feb. 6, 2012, now abandoned.

(51) Int. Cl.
*F24C 7/08* (2006.01)
*A23L 5/10* (2016.01)

(52) U.S. Cl.
CPC ............... *F24C 7/088* (2013.01); *A23L 5/15* (2016.08); *F24C 7/085* (2013.01)

(58) Field of Classification Search
CPC ........ A23L 1/0128; F24C 7/085; F24C 7/086; F24C 7/088
USPC ............................ 99/332, 337; 219/494, 681
See application file for complete search history.

(56) References Cited

U.S. PATENT DOCUMENTS

| | | | |
|---|---|---|---|
| 4,396,817 A | 8/1983 | Eck et al. | |
| 4,585,925 A | 4/1986 | Andre | |
| 4,920,948 A | 5/1990 | Koether et al. | |
| 5,043,860 A | 8/1991 | Koether et al. | |
| 5,179,265 A | 1/1993 | Sheridan et al. | |
| 5,780,818 A | 7/1998 | Hansson | |
| 5,877,477 A | 3/1999 | Petty et al. | |
| 5,938,961 A | 8/1999 | Maher, Jr. | |
| 6,142,666 A | 11/2000 | Koether et al. | |
| 6,628,268 B1 * | 9/2003 | Harada | G06F 1/1626 345/173 |
| 6,744,026 B2 | 6/2004 | Ishikawa | |

(Continued)

OTHER PUBLICATIONS

International Search Report for PCT/US13/24951 dated Apr. 19, 2013.

(Continued)

*Primary Examiner* — Quang D Thanh
*Assistant Examiner* — James Sims, III
(74) *Attorney, Agent, or Firm* — Amster, Rothstein & Ebenstein LLP

(57) ABSTRACT

A method for cooking food items in an oven is disclosed. A history of instant oven temperatures is initially obtained during a cook of a first food item. A salient representation of the oven temperature history is stored in a non-volatile memory. The salient representation includes multiple average oven temperatures, each selected to represent a summary of the instant oven temperatures at various specific time periods throughout the cook of the first food item. During a cook of a second food item that is substantially similar to the first cook item, the current cook settings are dynamically adjusted during the cook of the second food item based on the results of a comparison between the instant oven temperatures and the stored average oven temperatures in order to duplicate the result of the cook of the first item.

19 Claims, 3 Drawing Sheets

(56) References Cited

U.S. PATENT DOCUMENTS

| | | |
|---|---|---|
| 2002/0121514 A1 | 9/2002 | Ishikawa |
| 2004/0212509 A1 | 10/2004 | Zweig |
| 2005/0274711 A1 | 12/2005 | Boyer |
| 2009/0134151 A1* | 5/2009 | Bogatin ............... F24C 15/325 219/681 |
| 2009/0188396 A1* | 7/2009 | Hofmann ............... G01K 1/024 99/342 |
| 2009/0236333 A1 | 9/2009 | Ben-Shmuel et al. |
| 2009/0236334 A1 | 9/2009 | Ben-Shmuel et al. |
| 2010/0015313 A1 | 1/2010 | Harris |
| 2011/0215091 A1 | 9/2011 | Stanger |
| 2011/0311690 A1* | 12/2011 | Franzolin ............... F24C 7/08 426/231 |

OTHER PUBLICATIONS

International Preliminary Report on Patentability for PCT/US13/24951 dated Aug. 12, 2014.
Office Action of U.S. Appl. No. 13/367,164 dated Feb. 9, 2017.

* cited by examiner

COOKING OVEN

CROSS REFERENCE TO RELATED APPLICATION

This application is a divisional of U.S. application Ser. No. 13/367,164, filed on Feb. 6, 2012, the entire content of which is incorporated herein by reference.

BACKGROUND OF THE INVENTION

1. Technical Field

The present invention relates to ovens in general, and in particular to a method for cooking food in an oven.

2. Description of Related Art

Conventional ovens generally use a temperature feedback mechanism to maintain oven temperature relatively constant at a set temperature. The temperature feedback mechanism turns on the heating source when the oven temperature is less than the set temperature, and turns off the heating source when the oven temperature is greater than the set temperature. Basically, the only information that matters is the oven temperature, and the only action taken based on the oven temperature information is to turn the heating source on or off in order to maintain the oven temperature as close to the set temperature as possible.

Once the oven temperature of an oven has reached a steady state (i.e., the set temperature), a user can at any time put a food item into the oven. The amount of time the food item should be in the oven may be determined by the internal temperature at which the food item has reached. Once the food item has reached a predetermined internal temperature, the food item is considered to be "done." In other words, for conventional ovens, once the oven has achieved the set temperature, the only other variable is time. A food item is considered to be done when it has been placed in the oven operating at the proper set temperature for the desired amount of time.

Rapid-cook ovens operate almost entirely based on time. Once a rapid-cook oven has reached its set temperature, for example, if a user pushes a button on a user interface that says "pepperoni pizza," a set of previously entered cooking instructions that correspond to that selected food item are executed. Those cooking instructions may include: cook food item with a microwave on 50% power and a blower on 100% power for 1.5 minutes, and then continue to cook food item with the microwave on 100% power and the blower on 80% power for another 3 minutes. At the end of the 4.5 minute period, the cooking of the food item is deemed to have been completed because the allotted cooking time at the desired temperature and cook profile conditions have been met.

The present invention provides an improved method for cooking food items in an oven.

SUMMARY OF THE INVENTION

In accordance with a preferred embodiment of the present invention, a history of instant oven temperatures is initially obtained during a cook of a first food item. A salient representation of the oven temperature history is stored in a non-volatile memory. The salient representation includes multiple average oven temperatures, each selected to represent a summary of the instant oven temperatures at various specific time periods throughout the cook of the first food item. During a cook of a second food item that is substantially similar to the first cook item, a set of instant oven temperatures is obtained at the same various specific time periods during the cooking of the first cook item, and the current cook settings are dynamically adjusted during the cook of the second food item based on the results of a comparison between the obtained instant oven temperatures and the stored average oven temperatures in order to duplicate the result of the cook of the first item.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF PREFERRED EMBODIMENTS

Figure 1:
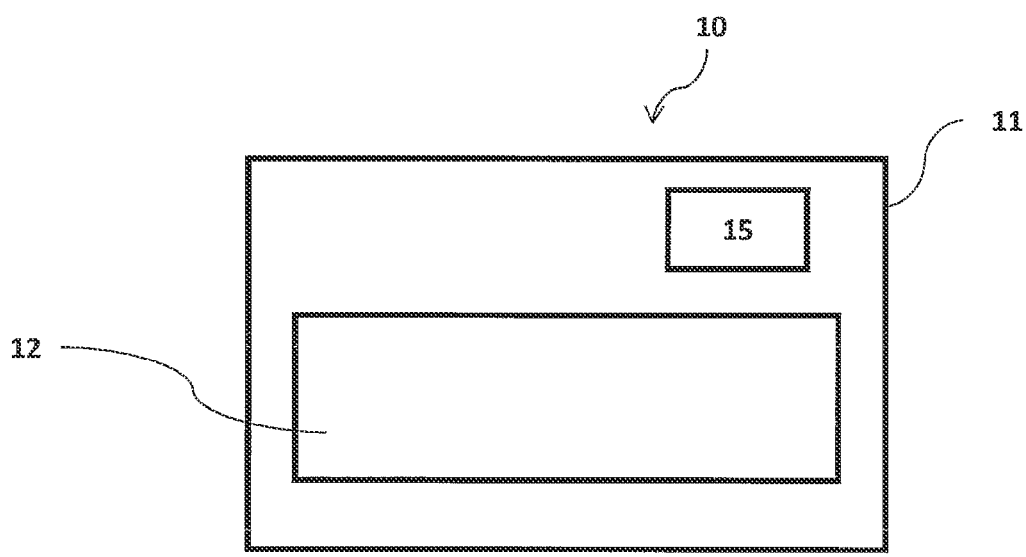
FIG. 1 is a front view of an oven in which a preferred embodiment of the present invention can be incorporated.

Referring now to the drawings and in particular to FIG. 1, there is depicted a front view of an oven in which a preferred embodiment of the present invention may be incorporated. As shown, an oven 10 is defined by a housing 11 having a cavity 12. Oven 10 includes a heating and airflow system (not shown) to supply heat to cavity 12 for heating up any food items that have been placed inside cavity 12.

Oven 10 also includes a user interface panel 15. User interface panel 15 is preferably implemented with touchscreens but they can also be implemented with keypads and liquid crystal displays. A user can enter commands, such as cooking temperature within cavity 12, cooking time, blower speed, microwave, steam amount, etc., via user interface panel 15 to effectuate cooking controls on any food items placed within cavity 12. In addition, oven 10 includes various electronic devices (not shown), such as a controller, volatile memories, and non-volatile memories, for providing various functions related to oven operations.

In accordance with a preferred embodiment of the present invention, an oven operates under at least two different modes, namely, cook_setting_development mode and cook_with_setting mode. During the cook_setting_development mode, various cook settings for different food items can be developed and stored in a non-volatile memory within the oven. During the cook_with_setting mode, a specific cook setting corresponding to a food item to be cooked is recalled from the non-volatile memory, and the food item is cooked in the oven with the specific cook setting.

I. Cook_Setting_Development Mode

Figure 2:
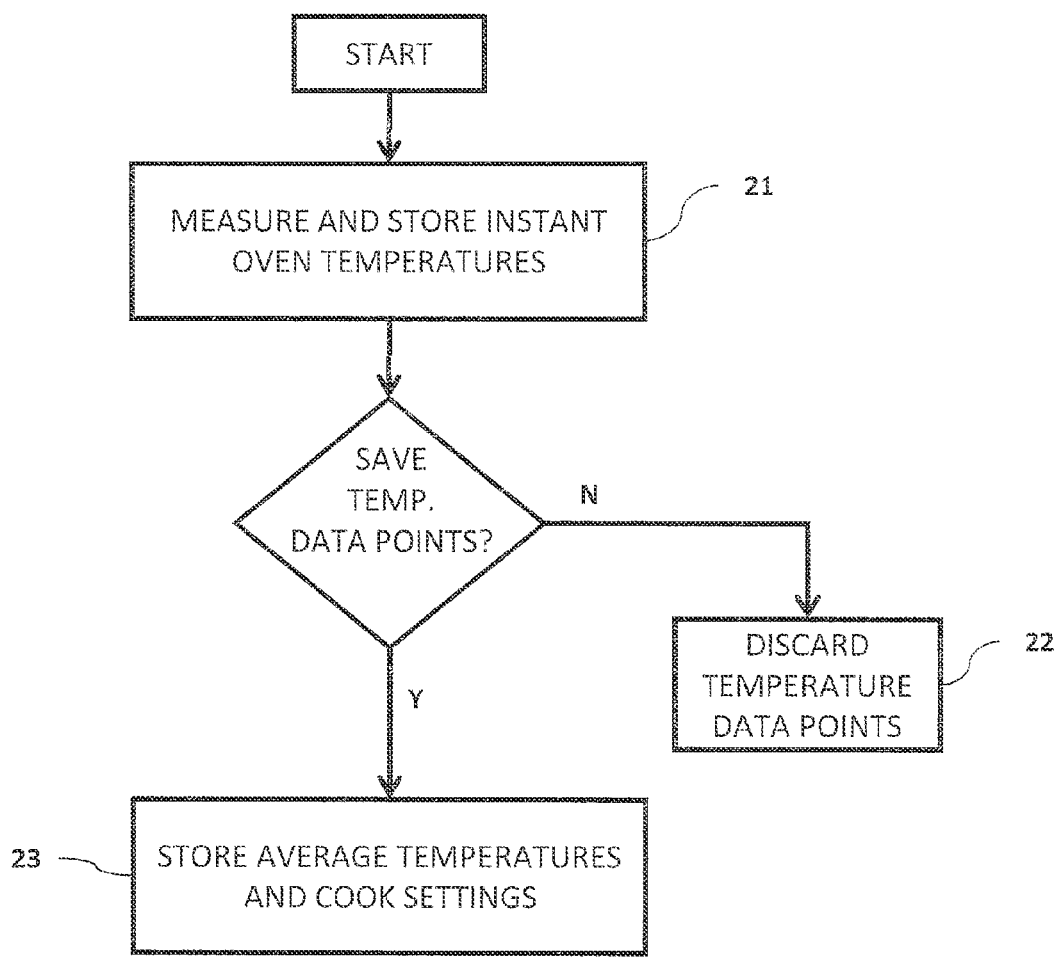
FIG. 2 is a flowchart of a method for developing a cook setting for a food item during a cook_setting_development mode of the oven from FIG. 1, in accordance with a preferred embodiment of the present invention.

When a cook is performed on a first food item during the cook_setting_development mode, instant oven temperatures are measured throughout the cook cycle of the first food item, and all the measured instant oven temperatures are stored in a memory array within a volatile memory of the oven, as shown in block 21 of FIG. 2. Preferably, each entry of the array contains the instant oven temperature at each one second of the cook cycle. The array is to be viewed to have ten equal-sized sections. So, for a four-minute cook cycle, the array will contain 4×60=240 instant oven temperature data points, and each of the ten sections contains 240/10=24 instant oven temperature data points. As another example, if the cook cycle is six minutes, then the array will contain 6×60=360 instant oven temperature data points, and each of the ten sections contains 360/10=36 instant temperature data points.

After the cook cycle has been completed, the array should be populated with instant oven temperatures accordingly, and the number of temperature data points depends on the length of time of the cook cycle. At this point, if the temperature data points within the array are not saved by a user, such as a chef, the temperature data points within the array will eventually be discarded or overwritten by new temperature data points during a subsequent cook, as depicted in block 22 of FIG. 2.

However, if the chef is completely satisfied with the quality of the cooked first food item and considers the first food item is perfectly cooked, the chef can press a button on a user interface, such as user interface panel 15 from FIG. 1, to cause the average temperature of each of the ten sections within the array to be calculated, and to cause the ten average temperatures to be stored in the non-volatile memory along with the cook setting that was previously used to achieve the perfectly cooked food under a cook setting name such as Cook_setting X, as shown in block 23 of FIG. 2.

II. Cook_with_Setting Mode

When cooking a second food item, which is substantially similar to the first cook item, under the cook_with_setting mode, cook setting Cook_setting X is initially recalled from the non-volatile memory within the oven. During the cook cycle of the second food item, the instant oven temperatures are measured during the cook cycle, as shown in block 31 of FIG. 3. An average value of the measured instant oven temperatures is obtained at or near the end of each tenth segment of the cook cycle, as depicted in block 32 of FIG. 3. The average oven temperature value obtained at the end of each tenth segment of the cook cycle is compared to the stored average temperature value associated with Cook_setting X for the same time segment of the cook cycle, as shown in block 33 of FIG. 3.

Figure 3:
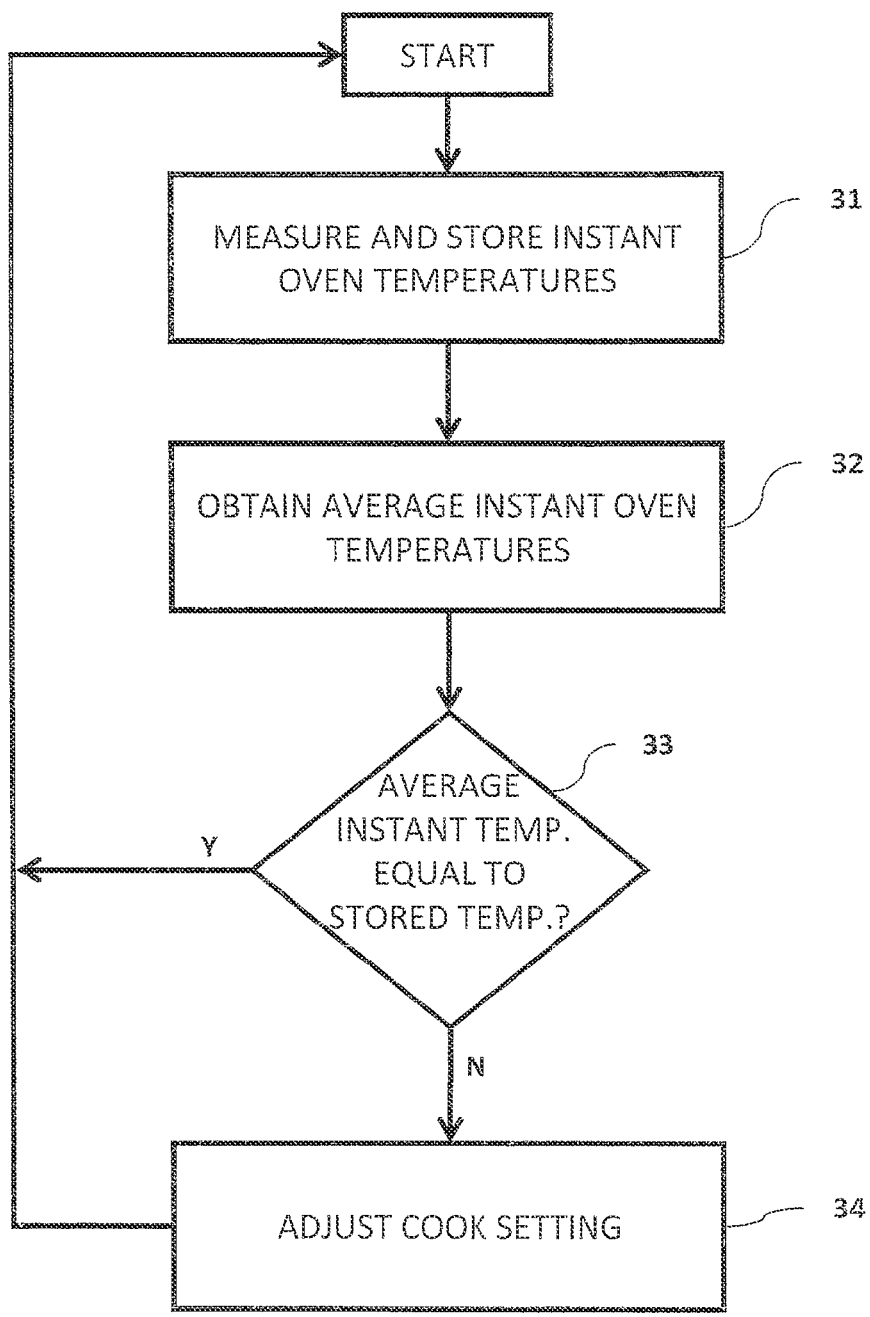
FIG. 3 is a flowchart of a method for cooking a food item using a cook setting during a cook_with_setting mode of the oven from FIG. 1, in accordance with a preferred embodiment of the present invention.

If the average oven temperature value of the "current" cook for the second food item is different from the stored average temperature value, then the time duration of that tenth segment of the cook cycle is extended or reduced by a correction factor of the time duration of that tenth segment of the cook cycle, as depicted in block 34 of FIG. 3. In essence, when cooking the second food item, the cook setting of the oven is dynamically adjusted according to the comparison of the average oven temperature values to the stored average values associated with Cook_setting X at the same time segments during the cook of the first food item.

For example, suppose the total cook time for the second food item, which is similar to the first food item, is five minutes (i.e., 300 seconds). If the stored average temperature value for the first tenth segment of the five-minute cook cycle (i.e., 30 seconds) is 450 degrees, and the measured average temperature value for the first tenth segment of the current cook (i.e., 30 seconds) is 441 degrees, that means there is a 450−441=9 degrees (or 9/450×100%=2%) difference between the stored and measured average temperature values. Based on that, the first tenth segment of the current cook can be extended by using a correction factor. When a correction factor of 2 is employed, then the first tenth segment of the current cook is extended by twice that amount, i.e., 2×2% ×30 seconds=1.2 seconds. Thus, if the measured average temperature value in each of the ten segments of the current cook is 9 degrees (or 2%) lower than its stored average temperature value counterpart, then the total cook time for the second food item will be extended by 10×1.2 seconds=12 seconds.

Although a correction factor of 2 is used in the above-mentioned example, it is understood by those skilled in the art that the correction factor can be any numerical value. In addition, while the difference between the measured and stored average temperature values in each of the ten segments of the current cook is shown to be the same (i.e., 9 degrees lower) in the above-mentioned example, it is understood by those skilled in the art that the average temperature difference may vary from one segment to another, and from one cook cycle to another.

It is also understood by those skilled in the art that the difference between the measured and stored average temperature value can be a positive number, a negative number or zero. A positive number will result in a reduction of the corresponding tenth segment of the current cook cycle. A negative number will result in an extension of the corresponding tenth segment of the current cook cycle. A zero means nothing needs to be changed to the corresponding tenth segment of the current cook cycle. A total cook cycle can have any of the positive, negative and zero average temperature differences. Thus, an entire current cook cycle for the second food item may have, for example, 3 time extensions (to increase the corresponding tenth segments of the current cook cycle by a total of 10 seconds) and 2 time reductions (to reduce the corresponding tenth segments of the current cook cycle by a total of 8 seconds) for a net change in the total cook time of an additional 2 seconds.

As has been described, the present invention provides an improved method of cooking in an oven. While all conventional ovens capture an instant oven temperature and use it in the temperature feedback loop, then discard it immediately thereafter, the method of the present invention captures a history of instant oven temperatures for a "perfect" cook, and compares each subsequent cook to that perfect cook as the cook is unfolding and makes a series of small adjustments to the cook cycle based on those differences so that the conditions that resulted in the "perfect" cook can be duplicated as closely as possible.

Those skilled in the art will appreciate that the mechanisms of the present invention are capable of being distributed as a program product in a variety of recordable type media such as compact discs and digital video discs.

While the invention has been particularly shown and described with reference to a preferred embodiment, it will be understood by those skilled in the art that various changes in form and detail may be made therein without departing from the spirit and scope of the invention.

What is claimed is:
1. An oven comprising:
 a controller configured to perform operational functions of the oven under a cook setting development mode and a cook with setting mode, the controller comprising:
  a volatile memory;
  a non-volatile memory; and
  a non-transitory recordable type medium having stored thereon program code, wherein when executed by the controller, the program code causes the controller to perform steps of the cook setting development mode and steps of the cook with setting mode based on results of the cooking setting development mode;

a housing having a cavity configured to receive a first food item while the controller performs the cook setting development mode and to receive a second food item substantially similar to the first food item while the controller performs the cook with setting mode;

a heating system for supplying heat to the cavity; and a user interface panel for entering a cook setting for the first food item and receiving a command to save the cook setting while the controller performs the cook setting development mode, wherein the cook setting development mode comprises:

measuring, by the controller, a plurality of first instant oven temperature values during a cook cycle of the first food item, the cook cycle being divided into multiple time segments, storing, by the controller, the first instant oven temperature values in the volatile memory, and when the user interface panel receives the command to save the cook setting, calculating, for each of the time segments of the cook cycle of the first food item, by the controller, a first average oven temperature value based on the first instant oven temperature values obtained during each of the time segments of the cook cycle of the first food item and stored in the volatile memory and storing, by the controller, the cook setting and the first average oven temperature values in the non-volatile memory; and wherein the cook with setting mode comprises:

recalling, by the controller, the stored cook setting from the non-volatile memory, measuring, by the controller, a plurality of second instant oven temperature values during a cook cycle of the second food item, the cook cycle of the second food item comprising multiple time segments, at or near the end of each of the time segments of the cook cycle of the second food item, calculating, by the controller, a second average oven temperature value based on the second instant oven temperature values obtained during the time segment of the cook cycle of the second food item, comparing, by the controller, the second average oven temperature value from the cook with setting mode to the first average oven temperature value from the cook setting development mode for the corresponding time segment of the cook cycle of the first food item stored in the non-volatile memory as a result of the cook setting development mode, and dynamically adjusting, by the controller, the cook setting of the time segment of the cook cycle for the second food item when the second average oven temperature value for the time segment of the cook cycle of the second food item is different from the stored first average oven temperature value for the corresponding time segment of the cook cycle of the first food item.

2. The oven of claim 1, wherein the controller is configured to dynamically adjust the cook setting of the time segment of the cook cycle of the second food item by extending a time duration of the time segment of the cook cycle of the second food item based on a correction factor, if the second average oven temperature value for the time segment of the cook cycle of the second food item is less than the stored first average oven temperature value for the corresponding time segment of the cook cycle of the first food item.

3. The oven of claim 1, wherein the controller is configured to dynamically adjust the cook setting of the time segment of the cook cycle of the second food item by extending a time duration of the time segment by (the time duration of the time segment)×(the difference between the stored first average oven temperature value and the second average oven temperature value)×(a correction factor)÷(the stored first average oven temperature value).

4. The oven of claim 3, wherein the correction factor is 2.

5. The oven of claim 1, wherein the volatile memory comprises a plurality of sections, each of the sections being configured to store the first instant oven temperature values obtained during the corresponding one of the time segments of the cook cycle of the first food item.

6. The oven of claim 5, wherein the sections are all equal-sized.

7. The oven of claim 1, wherein the time segments of the cook cycles of the first and second food items are all equal-sized.

8. The oven of claim 1, wherein the controller is configured to obtain the first instant oven temperature values at each second of the cook cycle of the first food item when performing the cook setting development mode and to obtain the second instant oven temperature values at each second of the cook cycle of the second food item when performing the cook with setting mode.

9. The oven of claim 1, wherein the user interface panel comprises a button, which, when pressed, is configured to cause the controller to calculate the first average oven temperature for each of the time segments of the cook cycle of the first food item and to store the cook setting and the first average oven temperature values in the non-volatile memory.

10. The oven of claim 1, wherein the user interface panel comprises a touchscreen, or a key pad and a liquid crystal display.

11. An oven comprising:

a housing having a cavity;

a heating system for supplying heat to the cavity;

a user interface; and a controller configured to perform operational functions of the oven under a first mode of operation and a second mode of operation, the controller comprising:

a volatile memory;

a non-volatile memory; and a non-transitory recordable type medium having stored thereon program code, wherein when executed by the controller, the program code causes the controller to perform steps of the first mode of operation and steps of the second mode of operation based on results of the first mode of operation, wherein the first mode of operation comprises:

measuring, by the controller, a plurality of first instant oven temperatures within the cavity during a cook cycle of a first food item, the cook cycle comprising multiple time segments, storing, by the controller, the measured first instant oven temperatures in the volatile memory, upon receipt of a command from a user by the user interface, calculating, by the controller, an average oven temperature for each of the time segments based on the first instant oven temperatures stored in the volatile memory, and storing, by the controller, the average oven temperatures in the non-volatile memory; and wherein the second mode of operation comprises:

measuring, by the controller, second instant oven temperatures within the cavity during a time segment of a cook cycle of a second food item substantially similar to the first food item, the cook cycle of the second food item comprising multiple time segments, calculating, by the controller, an average value of the second instant oven temperatures for the time segment of the cook cycle for the second food item, comparing, by the controller, the average value from the second mode of operation with the stored average oven temperature from the first mode of operation for the corresponding time segment of the cook cycle for the first food item, and dynamically adjusting, by the controller, a current cook setting based on the comparison between the average value from the second mode of operation and the stored average oven temperature from the first mode of operation for the corresponding time segment of the cook cycle of the first food item.

12. The oven of claim 11, wherein the user interface comprises a button, which, when pressed by the user, causes the controller to calculate the average temperature for each of the time segments for the cook cycle of the first food item and to store the calculated average temperatures in the non-volatile memory.

13. The oven of claim 11, wherein the controller dynamically adjusts a current cook setting by extending or reducing a time duration of the time segment of the cook cycle of the second food item by a correction factor.

14. The oven of claim 11, wherein the user interface comprises a touchscreen, or a key pad and a liquid crystal display.

15. The oven of claim 11, wherein the time segments are all equal-sized.

16. The oven of claim 11, wherein the controller is configured to measure the first instant oven temperatures at each second of the cook cycle of the first food item when performing the first mode of operation and to measure the second instant oven temperatures at each second of the cook cycle of the second food item when performing the second mode of operation.

17. An oven comprising:
a housing having a cavity;
a heating system for supplying heat to the cavity; and
a controller configured to perform operational functions of the oven under a first mode of operation and a second mode of operation, the controller comprising:
a volatile memory;
a non-volatile memory; and
a non-transitory recordable type medium having stored thereon program code, wherein when executed by the controller, the program code causes the controller to perform steps of the first mode of operation and steps of the second mode of operation based on results of the first mode of operation, wherein:
the first mode of operation comprises:
measuring, by the controller, a plurality of first instant oven temperatures within the cavity during a cook cycle of a first food item, the cook cycle comprising multiple time segments, storing, by the controller, the measured first instant oven temperatures in the volatile memory, determining, by the controller, an average temperature for each of the time segments of the cook cycle of the first food item based on the first instant oven temperatures stored in the volatile memory, and storing, by the controller, the the average temperatures in the non-volatile memory; and the second mode of operation comprises:

measuring, by the controller, second instant oven temperatures within the cavity during a time segment of a cook cycle of a second food item substantially similar to the first food item, the cook cycle of the second food item comprising multiple time segments, determining, by the controller, an average value of the second instant oven temperatures for the time segment of the cook cycle of the second food item comparing, by the controller, the average value from the second mode of operation with the stored average temperature from the first mode of operation for the corresponding time segment of the cook cycle of the first food item, and dynamically adjusting, by the controller, a current cook setting based on the comparison between the average value from the second mode of operation and the stored average temperature from the first mode of operation for the corresponding time segment of the cook cycle of the first food item.

18. The oven of claim 17, wherein the controller dynamically adjusts a current cook setting by extending or reducing a time duration of the time segment of the cook cycle of the second food item by a correction factor.

19. The oven of claim 17, wherein the time segments are all equal-sized.

* * * * *